March 10, 1959 R. E. CRANDALL 2,877,034
CONTROL SYSTEM COMPONENTS BACKLASH REMOVING DEVICE
Filed June 21, 1954
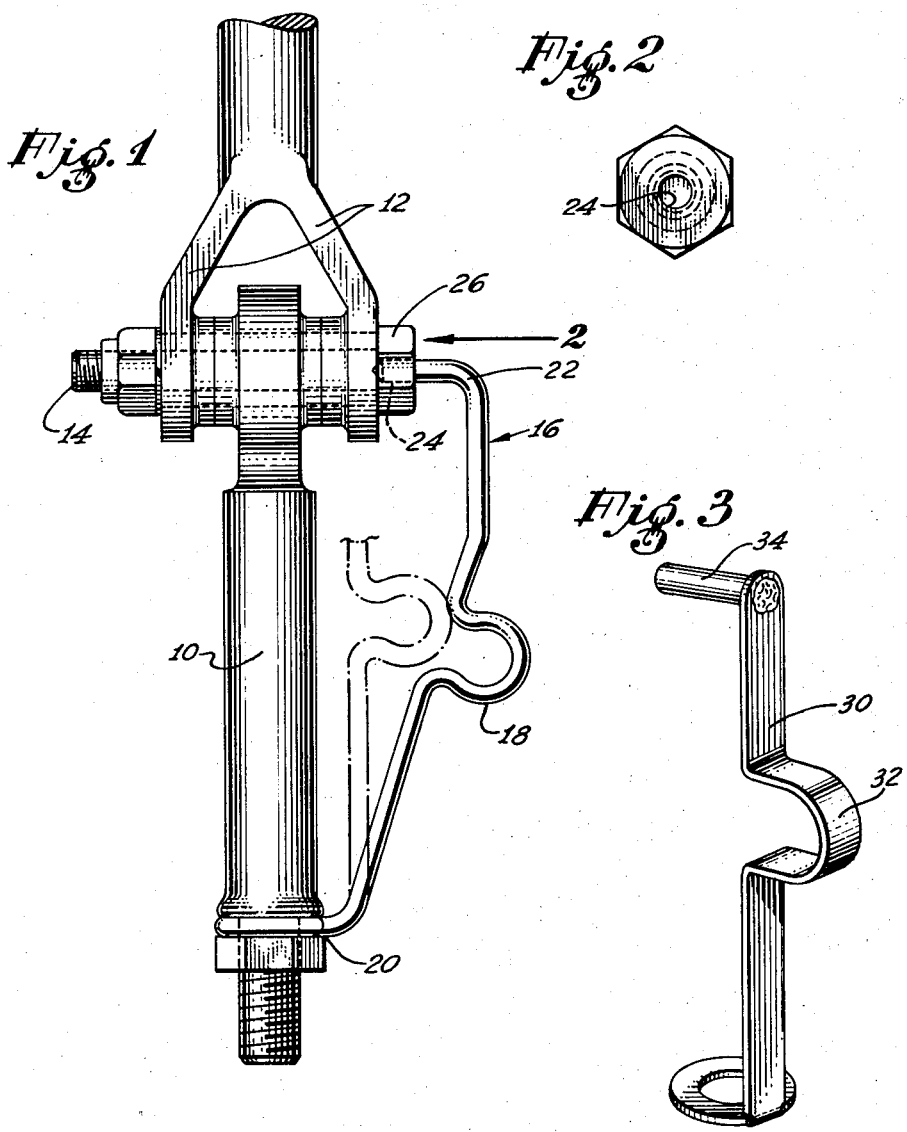
INVENTOR:
Ronald E. Crandall
By Herbert E. Metcalf
His Patent Attorney

United States Patent Office 2,877,034
Patented Mar. 10, 1959

2,877,034

CONTROL SYSTEM COMPONENTS BACKLASH REMOVING DEVICE

Ronald E. Crandall, Los Angeles, Calif., assignor to Northrop Aircraft, Inc., Hawthorne, Calif., a corporation of California Application June 21, 1954, Serial No. 438,074

2 Claims. (Cl. 287—100)

This invention relates to the removal of backlash or looseness in pivoted parts, and more particularly to a means for obtaining minimum backlash and axial play in a pair of members rotating on a common pivot pin.

The use of the present invention will greatly reduce looseness in aircraft control system joints, for example, where the accumulated backlash or looseness from several pivoted joints is highly undesirable.

The invention includes the combination, with a pivot pin or bolt, of a spring secured at one end to the head of the pin and the other end fixed to one of the moving members, the pull of the spring on the pivot pin head simultaneously tilting and axially stressing the pin, thus minimizing longitudinal and lateral axial play in the joint.

It is a primary object and purpose of the present invention to provide a tension spring imposing longitudinal and axial stresses of this character which can be easily applied to any joint, and which, when applied, is held securely against disconnection.

A further object of the invention is to provide a spring tension device made from a single length of spring material which is bent into the desired shape to provide stresses in one longitudinal and one axial direction.

Another object of the invention is to provide a simple and effective spring device to compensate for wear in the joint, whereby wear in the joint referred to is taken up as it occurs.

Other more specific objects of the present invention will appear from the disclosure of the following detailed description thereof, having reference to the accompanying drawings which illustrate a preferred embodiment thereof and constitute a part of said disclosure.

In the drawings:

Figure 1 is a view of a pivoted joint showing one embodiment of the present invention.

Figure 2 is a front view taken as indicated by the arrow 2 in Figure 1.

Figure 3 is a perspective view of a flat spring embodiment of the present invention.

Referring to Figure 1, a typical joint, common to aircraft control system components, embodying the present invention, is shown as consisting of a rod 10, and a clevis 12 to which it is pivoted with pin 14. A length of spring wire 16 which includes a loop 18 which is also formed to exert lateral stress axially, is anchored at one end 20 to a rod 10, the other end of the wire being bent at right angles at 22, the spring wire being stretched to insert the bent end 22 in an axially drilled hole 24 in the head 26 of the pivot pin 14, thus tilting the pin 14.

By securely anchoring the spring 16 at 20 the wire spring 16 can then be formed to exert tension in a lateral axial direction, thus simultaneously tilting and moving the pin 14.

The spring 16 is constructed from a length of steel wire, preferably spring tempered after it has been formed.

The temper of the spring 16, the wire diameter, and loop 18 size, are designed to include longitudinal tension and lateral axial forces applicable to the particular joint shown.

In Figure 3 is illustrated a flat spring application of the present invention. The spring 30 is constructed preferably from a flat strip of spring steel, the thickness gage, loop 32 size being designed to produce longitudinal and lateral axial tension forces for the particular application shown.

The rod 34 is riveted to the spring 30, and is designed to withstand the forces involved.

Both springs 16 and 30 are designed to include lateral tension urging the spring towards rod 10, thus retaining the spring in hole 24 (Figure 1).

From the foregoing description of the present invention, it can readily be seen that the backlash and lateral axial play in aircraft control system joints can be substantially reduced without introducing appreciable friction, and that the device can be easily installed and economically produced.

While in order to comply with the statute, the invention has been described in language more or less specific as to structural features, it is to be understood that the invention is not limited to the specific features shown, but that the means and construction herein disclosed comprises a preferred form of putting the invention into effect, and the invention is therefore claimed in any of its forms or modifications within the legitimate and valid scope of the appended claims.

What is claimed is:

1. A joint having a minimum backlash, comprising in combination: a pivot pin; a pair of opposed members, in substantially end to end, linearly aligned relationship, that rotate about said pivot pin; and a resilient spring connecting one of said members with said pivot pin, said spring being fixed at one end to one of said members, the other end thereof axially bearing against an end of said pivot pin, said spring having a loop therein wherein the spring is biased to simultaneously tend to shorten and to move laterally against said members.

2. A joint having a minimum backlash, comprising in combination: a pivot pin having an opening therein; a pair of opposed members, in substantially end to end, linearly aligned relationship, that rotate about said pivot pin; and a resilient spring, having two ends one being bent, connecting one of said members with said pivot pin, said spring being fixed at one end to one of said members, the other, bent end thereof, being received in said opening and axially bearing against an end of said pivot pin; said spring having a loop therein wherein the spring is biased to simultaneously tend to shorten and to move laterally against said members.

References Cited in the file of this patent

UNITED STATES PATENTS

| | | |
|---|---|---|
| 313,242 | Richardson | Mar. 3, 1885 |
| 601,241 | Conlon | Mar. 29, 1898 |
| 611,320 | James | Sept. 27, 1898 |
| 710,849 | Dodd | Oct. 7, 1902 |
| 1,301,883 | Strom | Apr. 29, 1919 |
| 1,303,293 | Gries | May 13, 1919 |
| 1,558,731 | Withrow | Oct. 27, 1925 |

FOREIGN PATENTS

| | | |
|---|---|---|
| 447,595 | Great Britain | May 21, 1936 |